United States Patent [19]
Prett et al.

[11] 4,349,869
[45] Sep. 14, 1982

[54] DYNAMIC MATRIX CONTROL METHOD

[75] Inventors: David M. Prett; Brian L. Ramaker, both of Houston; Charles R. Cutler, Katy, all of Tex.

[73] Assignee: Shell Oil Company, Houston, Tex.

[21] Appl. No.: 80,966

[22] Filed: Oct. 1, 1979

[51] Int. Cl.³ .................. G06F 15/46; G05B 13/04
[52] U.S. Cl. .................. 364/159; 364/149; 364/153; 364/156; 364/165; 364/500
[58] Field of Search .......... 364/105, 106, 116, 500, 364/501, 502, 148–159, 164, 165, 172

[56] References Cited

U.S. PATENT DOCUMENTS

| | | | |
|---|---|---|---|
| 3,044,701 | 7/1962 | Kerstukos et al. | 364/105 |
| 3,534,400 | 10/1970 | Dahlin | 364/106 |
| 3,798,426 | 3/1974 | Bristol | 364/105 |
| 3,828,171 | 8/1974 | Griffin | 364/105 X |
| 3,862,403 | 1/1975 | Kurihara | 364/105 |
| 3,873,816 | 3/1975 | Takeyama et al. | 364/105 X |
| 3,891,836 | 6/1975 | Lee | 364/105 X |
| 4,169,283 | 9/1979 | Lewis | 364/105 X |

FOREIGN PATENT DOCUMENTS 843793  8/1960  United Kingdom ........... 364/105

OTHER PUBLICATIONS

McGrath et al.–"A Parameter-Perturbation Adaptive Control System"–IRE Trans. On Automatic Control–May 1961–pp. 154–162.

Schenk–"A Method For On-Line Static Optimizing Control In A Power System Subject To Stochastic Inputs"–Canadian Communications And Power Conference, Montreal, Canada–Oct. 20–22, 1976–pp. 274–277.

Vural–"Effects Of Perturbations On The Performance Of Optimum/Adaptive Arrays"–IEEE Trans. on Aerospace And Electronic Systems–vol. AES-15, No. 1, Jan. 1979–pp. 76–87.

*Primary Examiner*—Joseph F. Ruggiero

[57] ABSTRACT

A method for controlling and optimizing the operation of a series of interdependent processes in a plant environment. Manipulation of one or more constrained process input variables is used to achieve feedforward-/feedback control of one or more process output variables. In the synthesis of the method of controlling and optimizing, input variables are subjected to measured perturbations and the dynamic effects on the outputs are noted for prediction of the future response of the processes during on-line operation. Time variant and time invariant constraints on system operation are incorporated to allow optimum operation of the interdependent processes.

8 Claims, 10 Drawing Figures

$$\begin{bmatrix} E^1_1 \\ E^1_2 \\ E^1_3 \\ E^1_4 \\ \vdots \\ E^1_{35} \\ \hline E^2_1 \\ E^2_2 \\ E^2_3 \\ E^2_4 \\ \vdots \\ E^2_{35} \end{bmatrix} = \begin{bmatrix} Q_{1,1} & Q_{1,2} & Q_{1,3} & Q_{1,4} \\ \hline Q_{2,1} & Q_{2,2} & Q_{2,3} & Q_{2,4} \end{bmatrix} \overset{S}{\cdot} \begin{bmatrix} X^1_1 \\ X^1_2 \\ \vdots \\ X^1_{15} \\ \hline X^2_1 \\ \vdots \\ X^2_{15} \\ \hline X^3_1 \\ \vdots \\ X^3_{15} \\ \hline X^4_1 \\ \vdots \\ X^4_{15} \end{bmatrix}$$

FIG. 2

$$Q_{i,j} = \begin{bmatrix} a_{1,1} & 0 & 0 & \cdots & \cdots & 0 \\ a_{2,1} & a_{1,1} & 0 & \cdots & \cdots & 0 \\ a_{3,1} & a_{2,1} & a_{1,1} & 0 & \cdots & 0 \\ & a_{3,1} & a_{2,1} & a_{1,1} & 0 & \cdots & 0 \\ \vdots & \vdots & \vdots & \vdots & & \vdots \\ a_{15,1} & a_{14,1} & a_{13,1} & a_{12,1} & \cdots & a_{1,1} \\ a_{15,1} & a_{15,1} & a_{14,1} & a_{13,1} & \cdots & a_{2,1} \\ \vdots & \vdots & \vdots & \vdots & & \vdots \\ a_{15,1} & a_{15,1} & a_{15,1} & a_{15,1} & \cdots & a_{15,1} \end{bmatrix}$$

DIMENSION 35 × 15

FIG. 10

$$\underset{1}{E} = \underset{2}{\underline{S}} \cdot \underset{3}{X}$$

$$\begin{bmatrix} (HI - TL - STP) \cdot W \\ 0 \\ 0 \end{bmatrix} = \begin{bmatrix} W & W & W & 0 & 0 \\ 0 & 0 & 0 & W & 0 \\ 0 & 0 & 0 & 0 & W \end{bmatrix} \cdot \begin{bmatrix} X^1_1 \\ X^1_2 \\ X^1_3 \\ X^1_4 \\ X^1_5 \end{bmatrix}$$

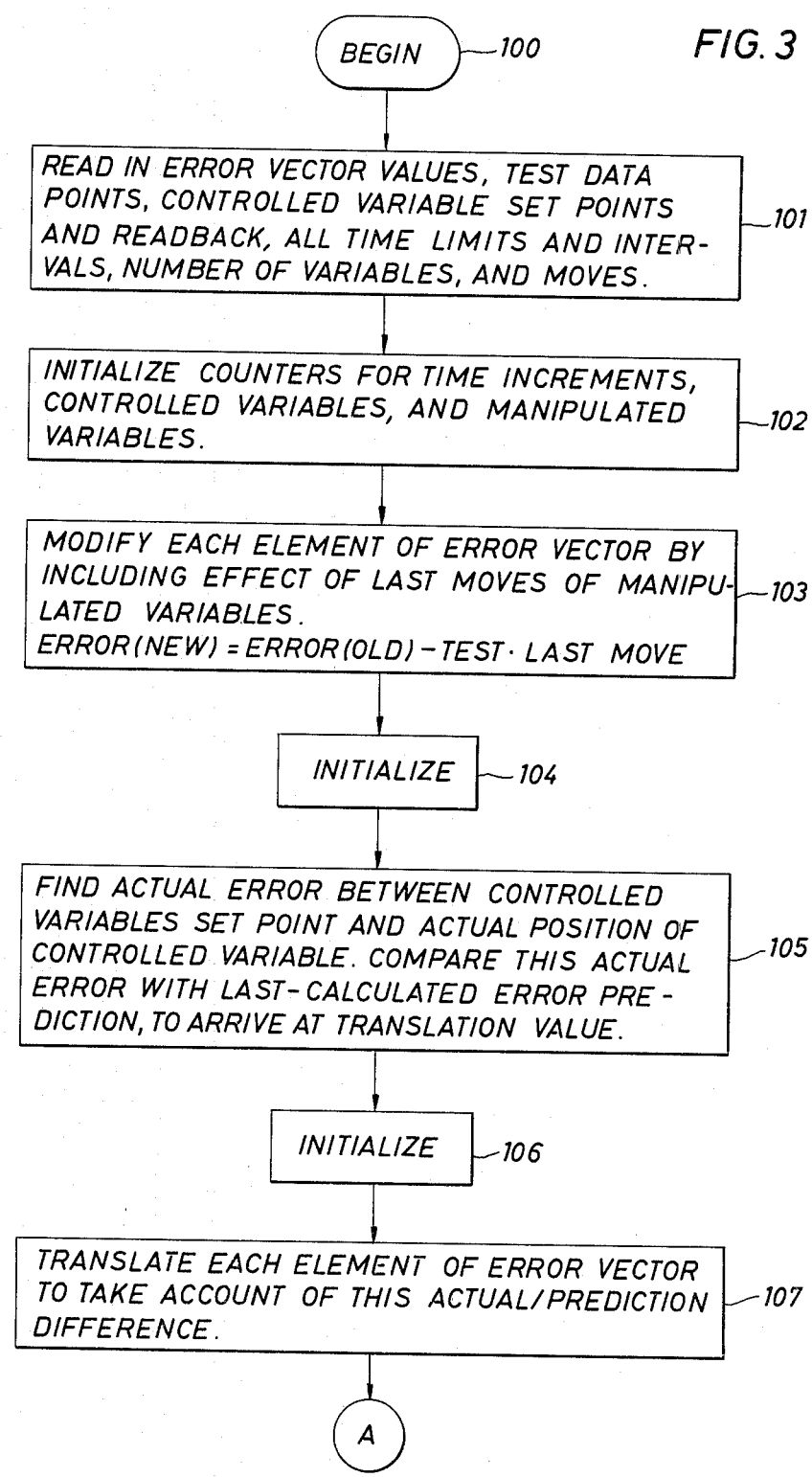

4,349,869

DYNAMIC MATRIX CONTROL METHOD

BACKGROUND OF THE INVENTION

This invention relates to a method of dynamic control for a process or series of processes, in an industrial environment, for example, in a petroleum refining or processing plant.

In industrial plants, it is important to minimize losses which are inherent in the processes being performed therein while at the same time maximizing profits. This loss minimization/profit maximization is achieved via the technique of linear programming optimization, commonly referred to as L-P optimization. With the advent of successful L-P optimization of processes in an on-line environment, it has become possible to optimize plant operations using small on-line computers. Optimization is normally repeated every 3 or 4 hours so that approximately six times per day, the profit derivable from the process can be increased by shifting the singular unit under control from one operating point to another. Generally, profit can be increased by pushing the operation as close as possible to system constraints, such as temperature, pressure or flow rate constraints. How close one can approach these constraints becomes a measure of the efficiency of the process control being utilized. Efficiency of the controller in moving from one operating point to another also becomes important. Assuming that L-P operating points lie close to, or actually on system constraints, the controller must be able to move from one point to the other without violating these constraints. As the controller's ability to adequately perform these tasks decreases, the operating points must retreat from the L-P dictated operating points thus causing profit loss. Good control allows the user to minimize this profit loss.

Feed forward control becomes important in the optimization of processes since the user may initiate controller action based upon a prediction of where the outputs, or controlled variables, are going. This is superior to waiting until the process disturbances have actually changed the controlled variables before controller action is initiated. Hence, an ideal controller should have significant feed forward as well as ample feedback action. In addition, the control method should be able to deal with constraints and constraint violations in a real time fashion. In general, the existing control systems are limited Proportional/Integral (P/I) controllers and ratio controllers. These may be found in both cascade and feed forward loops. A P/I controller may consist of a temperature controller cascaded to a flow controller such as for heat medium flow control to fractionation column reboilers. A typical example of the use of a ratio controller would be ratio controlling the reflux to a fractionation column based upon feed rate to the column.

Other than the initial tuning of these controllers, they are completely ignorant of their own limitations as well as the conditions existing elsewhere on the unit being controlled. Hence, a condition of column over-pressuring due to maintenance of tray temperature set point in the outer loop of a heat medium controller may result when a column upstream to the column under control passes excessive light material out its bottom, said bottom's flow being the feed to the column under control. In this case, suitable intervention of a human operator is needed to alleviate the problem. On more complicated operating units, the appropriate action to be taken by a human operator to alleviate a problem condition may not be so readily apparent.

Other problems with existing systems may occur due to the size of process disturbances. Although the local P/I controllers operate reasonably well in the absence of large scale disturbances, the situation changes when the unit is subjected to large disturbances such as bringing a cracking furnace down for de-coking in an olefin unit where 10 to 15% feed flow disturbances are considered usual. Oscillations of conventional controllers also give rise to problems. When the conventional optimization control procedure is interfaced with the unit, trouble may occur when the optimization control drives continuously against operating constraints and the P/I controller, with its inherent oscillatory character, forces the optimization control to retreat from the constraint, thus decreasing net derivable profit from the unit.

SUMMARY OF THE INVENTION

An object of the present invention is to incorporate unit dynamic responses during the synthesis of the optimization control method.

Another object is to provide a control method that has significant feed forward and feedback action.

Still another object of the invention is to provide a method whereby system constraint violations may be dealt with in a real-time fashion.

Still a further object of the invention is to provide an optimization control method that has an inbuilt awareness of output interaction, thus preventing the controllers from reaching an oscillatory state.

A further object is to provide a control method which incorporates time-invariant and time-variant operating constraints, so that the controllers may be forced to avoid violations of these constraints while maintaining the controlled variables at specified states.

Other objects and advantages of the invention will become apparent from the following description of the invention.

In accordance with the invention, a method of controlling and optimizing the operation of a process or series of processes is provided, which process has one or more independently controlled, manipulated variables and one or more controlled variables which are dependent upon the manipulated variables. In the method, test disturbances are introduced in the manipulated variables and the effect of the disturbance on the controlled variable is measured. Using the test data, the response of a controlled variable to a given change in one of the manipulated variables is calculated. The present values of the manipulated variables and controlled variables are measured and the calculated response of the controlled variable is used to calculate a new set of moves for the manipulated variables. The manipulated variables are then adjusted in accordance with the new set of moves to reach a new set of values. These moves, when implemented, have the effect of moving the controlled variable towards its optimum setpoint. Another feature of the invention allows comparison of the new values of the manipulated variables with their present values to determine whether some move limit would be violated which would prevent the manipulated variable from reaching the calculated new value. In addition, any manipulated variable which cannot be moved to its new value may be removed from the system and a new set of moves for the remaining manipulated variables may be calculated to compensate for the absence of the manipulated variable which is removed. A particularly useful feature of the invention allows the formation of a projection to some future time of future controlled variable values. In the same manner, a number of future moves of each manipulated variable may be calculated to control the future values of the controlled variables to their desired operating points. This feature allows one to anticipate where the process is going, and to compensate in the present moves to control any further problems.

In order to operate the method as efficiently as possible, only a part of the manipulated variable future moves which are calculated need be implemented before recalculating a new set of moves. To accord to various controlled variables more or less importance, depending on how efficiently that controlled variable must be moved to its optimum setpoint, the controlled variables may each be assigned weighting factors. These weighting factors have the effect of prioritizing the controlled variables.

Since it is recognized that not all inputs to a process may be independently controlled as are the manipulated variables, one feature of the invention allows the inclusion of various measurable disturbances such as feed rate to the unit under control in the method of control. Measurable disturbances are those inputs to the process under control which, although they are measurable, cannot be independently set by the control system. In this feature, test disturbances are introduced in the set of measurable disturbances. Responses of the controlled variables to these measurable disturbances are calculated based on the testing, whereby a given change in a measurable disturbance is correlated to a controlled variable response. After measuring the present values of the measurable disturbances and the controlled variables, the calculated controlled variable response may be used in calculating the new set of moves for the manipulated variables in order to move the controlled variable to its optimum setpoint and at the same time take into account these measurable disturbances.

Feedforward control is implemented by predicting at one or more points in the future the response of a process to changes in the manipulated variables and other measurable disturbances. Based on the predicted trend of the process, a number of future moves for the manipulated variables are then calculated to minimize the error between the desired response or set point and the predicted future response of the process. Feedback control is implemented by allowing modification of the predicted responses of the process through readback from the process outputs or controlled variables. The predictions used in the feedforward control technique are based, in part, upon previous plant testing, wherein test disturbances such as step changes are introduced into the inputs or manipulated variables, and the effect on the outputs or controlled variables is measured. The size of the introduced disturbances depends on the process in question but should be large enough to overcome errors due to noise or inadvertent changes in process manipulated variables which may occur during testing. The other contribution to the prediction used in feedforward control consists of constraints incorporated to limit the projection of moves on the manipulated variables so that process constraints are not violated. These constraints may be time variant or time invariant, and are included in the dynamic matrix control technique in such a way that if a constraint would be violated by a projected set of moves on a manipulated variable, adjustments in the future moves of the unconstrained manipulated variables are made to prevent this future violation.

The basis of the control technique is to predict a constrained set of moves on the manipulated variables which minimizes the error between the desired set point of the control variables and their status in real-time. Although this minimization may be performed in various ways, a particularly useful minimization technique involves minimizing the predicted squares' deviation of controlled outputs from their respective set points in a least squares fashion.

BRIEF DESCRIPTION OF THE DRAWINGS

FIG. 2 represents in vector-matrix notation the error equation utilized in the invention.

FIGS. 3 and 4 illustrate a flow chart for updating the error vector in the process control method.

FIG. 10 illustrates the matrix relation including the time variant constraint matrix.

DESCRIPTION OF THE PREFERRED EMBODIMENT

Figure 1:
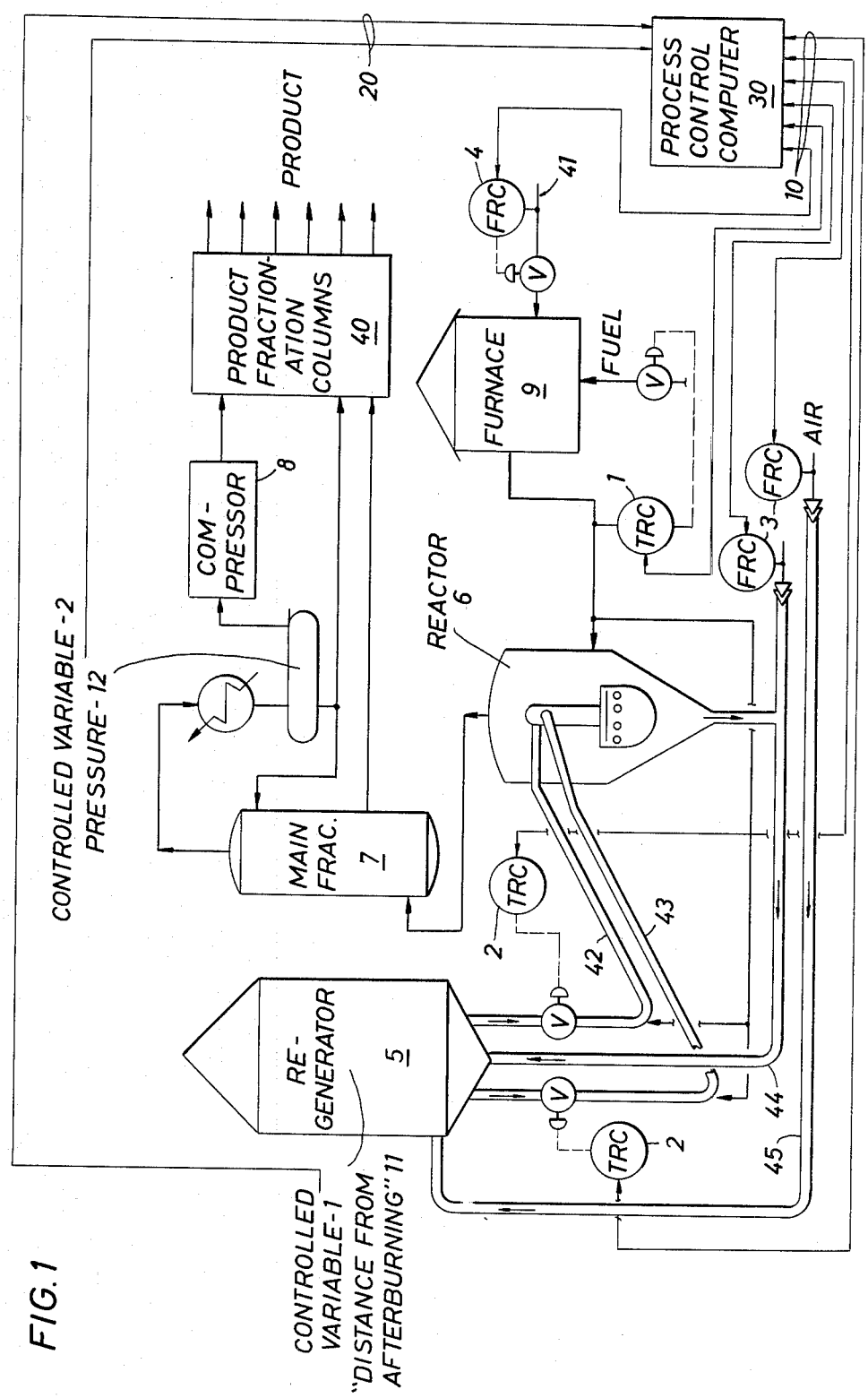
FIG. 1 represents a typical plant process which may be controlled by the dynamic matrix control technique of the invention.

The dynamic matrix control method of the invention involves compiling a matrix of values which relate inputs or manipulated variables, measurable disturbances, and time variant and invariant constraints on the one hand to the outputs or controlled variables of a series of interdependent processes on the other. This matrix serves as a model of the process or processes sought to be controlled. Modeling of the process is achieved via perturbation tests on the manipulated variables of the unit to be controlled and measuring the effect of the perturbation on the controlled variables. Using the test data, it is possible to predict in a feedforward manner the effects on the process of changes in the manipulated variables and measurable disturbances. This information is used to form a vector projection through time of the deviations of the controlled variables from their respective set points. Using a least squares minimization approach to solve the matrix, the projection can be used to derive an optimal vector projection of moves through time on each manipulated variable to return each controlled variable to its set point. However, because of the possibility of unmeasurable disturbances entering the process, the complete vector of moves for each manipulated variable is not implemented without first checking the controlled variables' projection against the actual feedback. Only the first move is actually implemented whereupon the problem is solved again with the new feedback information. In this way, unmeasurable disturbances and errors in the modeling technique can be accounted for via the process feedback.

Also included in the method is the ability to account for both time variant and time invariant process constraints. In the preferred embodiment, the time variant constraints are dealt with in a real time solution fashion, but the time invariant constraints are included in an off-line manner, thus increasing the efficiency of on-line operation of the control method. Inclusion of process constraints in the control method preserves the integrity of the system control even upon failure of some of the manipulated variable or input stations. Failure of an input station is accounted for by setting a zero move limit on the particular "failed" manipulated variable in the next predicted set of moves. In this way, the system may be maintained on stream virtually 100% of the time, whereas in conventional control systems failure of one input station would cause failure of the control method as a whole.

The resulting control method has been found particularly useful for implementation on small real-time computers, such as a Honeywell Model 4010 computer.

To assist in an understanding of the dynamic matrix control method, the mathematical development of a matrix will be illustrated. If the function "F" is a linear mapping, then the following equality must hold true:

$$F\left(\sum_{i=1}^{N} A_i X_i\right) = \sum_{i=1}^{N} A_i F(X_i) \tag{1}$$

Let F be the functional relationship between a process output (controlled variable) Y and a process input (manipulated variable) I. Hence $$Y = F(I) \tag{2}$$

Since the control algorithm is to be designed for a discrete system (real-time minicomputer control), let $X_i$ be the change in I over the interval (i−1) to i of duration $\Delta t$. Therefore $$I_N = \sum_{i=0}^{N-1} X_i + I_o \tag{3}$$

and $$Y_N = \sum_{i=0}^{N-1} F(X_i) + Y_o \tag{4}$$

(where $I_o$ and $Y_o$ are the starting points of the manipulated variable and controlled variable, respectively) written in expanded form for time intervals 1 to N, $Y_i$ may be written as $$Y_1 = A_1 \cdot X_o$$

$$Y_2 = A_2 \cdot X_o + A_1 X_1$$

$$\vdots$$

$$Y_N = A_N \cdot X_O - \phantom{xxxxxxxx} - + A_1 \cdot X_{N-1}$$

Where now $Y_i$ is the deviation $(Y_i - Y_o)$.

This can be written in vector matrix notation as $\underline{Y} = \underline{S}\ \underline{X}$, where $\underline{S}$ is the matrix comprised of values $A_i$, and where $$Y = \begin{bmatrix} Y_1 \\ Y_2 \\ \vdots \\ Y_N \end{bmatrix} ; X = \begin{bmatrix} X_o \\ \vdots \\ X_{n-1} \end{bmatrix}$$

The coefficients $A_i$ are determined by testing and process response fitting.

If $Y_i$ is now replaced by $E_i$ where $E_i = $ SETPOINT $- Y_i$, $E_i$ being defined as the error, then the moves X which satisfy the equation $$\underline{X} = \underline{S}^{-1} \cdot \underline{E}$$

($\underline{E}$ being the best estimate of the future response of the output in the absence of control, referred to as the error vector) are those moves whose predicted response will cause the output to lie at the setpoint throughout the time period $N\Delta t$ where $\Delta t = $ time between moves. If the number of moves to be made, $X_o$ through $X_{N-1}$, is less than the number of predicted error values $E_1$ through $E_N$, then $\underline{X}$ may be solved for using a conventional least-squares approach, i.e., $$\underline{X} = (\underline{S}^T \underline{S})^{-1} \cdot \underline{S}^T \underline{E} \tag{5}$$

(superscript 'T' denotes the operation of matrix transposition) Equation (5) then, becomes the basis of the control technique.

The first generalization of equation (5) is to include more than one manipulated variable and more than one controlled variable. If 'J' manipulated variables are to control 'K' controlled variables and J is not necessarily equal to K, then the formulation of equation (5) is the same where now:

$$X = \begin{bmatrix} X^1 \\ \hline X^2 \\ \vdots \\ \hline X^J \end{bmatrix} ; X^i = \begin{bmatrix} X_0^i \\ X_1^i \\ \vdots \\ X_M^i \end{bmatrix} \tag{6}$$

and $$E = \begin{bmatrix} E^1 \\ \hline E^2 \\ \vdots \\ \hline E^K \end{bmatrix} ; E^i = \begin{bmatrix} E_1^i \\ E_2^i \\ \vdots \\ E_N^i \end{bmatrix}$$

$$X = (\underline{S}^T \underline{S})^{-1} \cdot \underline{S}^T E$$

where 'M' represents the number of moves of each manipulated variable, and 'N' represents the number of changes in each controlled variable.

It is important to note that the error vector $\underline{E}$ must be scaled so that equally important changes in various controlled variables are treated equally. Hence, if a 0.10 psi change in a pressure were to be regarded as important as a 10° F. change in a temperature, then all error elements referring to pressure shoud be scaled up by a factor of $10^2$. Similarly, one can use this scaling technique to force the algorithm to apply more rigorous control to certain controlled variables. In many multivariable control problems, it is necessary to control one of the controlled variables more closely than the others for safety or other reasons. Scaling is a very simple technique developed to perform this function.

As shown in equation (5) the algorithm is of feedforward nature alone, where the error projection is based upon predicted effects of measurable disturbances and moves of the manipulated variables. To include feedback control, the readback from the process of the present values of the controlled outputs is used to translate the predicted error vector, $\underline{E}$, so that its prediction of the present values agrees with the readback. To fully utilize the readback, only the first move predicted in equation (6) for each manipulated variable is made. Having made this set of first moves, the error vector $\underline{E}$ is upgraded as follows:

$$\underline{E}_{NEW} = \underline{E}_{OLD} - (\underline{S}\,\underline{X} + \underline{T} + \text{UPDATE} + \underline{D}\,d) \quad (7)$$

$\underline{S}\cdot\underline{X}$ = effect of making first moves on each manipulated variable
$\underline{T}$ = translation of error vector to agree with readback (from feedback information)
UPDATE = to update the error vector through time by one increment, each element of $\underline{E}$ is moved up one row for each controlled variable. The last element is predicted by linear projection of the two earlier elements. In this way, all previous history is included in $\underline{E}$.
$\underline{D}\,\underline{d}$ = effect of measurable disturbances where $\underline{D}$ is the linear output/measurable disturbance response, determined during testing, and $\underline{d}$ is the vector of changes in the measurable disturbances in the readback.

Having determined $\underline{E}_{NEW}$, the next set of moves is predicted using equation (6). Note that only the 1st, $(1+M)^{th}$, $(1+2M)^{th}$, etc. rows of equation (6) need be evaluated, since only one move will be made in each manipulated variable before $\underline{E}_{NEW}$ is recalculated.

There are two distinct types of constraints which may have to be dealt with. How these are incorporated in the control technique is explained in the following.

(a) Time Invariant Constraints

These constraints are ones which the user is sure will not change with time and are independent of the particular state of the process at any given time. An example of this would be constraints upon the size of moves in manipulated variables. These constraints may be added to the system description of equation (6), where now $\underline{E}$ does not simply contain deviations from setpoints of controlled variables but also has elements which describe the state of these constraints.

EXAMPLE: If the sum of the moves in the $i^{th}$-manipulated variable were constrained so as to be maintained at zero, then an equation of the form $$O = K^* \left( \sum_{J=1}^{M} X_j \right), \quad J = \text{Number of moves of the manipulated variables} \quad (8)$$

would be added to the basic system description $$\underline{E} = \underline{S}\cdot\underline{X} \quad (9)$$

before the least squares solution of equation (6) is calculated. This particular constraint equation (8), may be used to force manipulated variables to optimization targets while still maintaining control of the unit. The weighting factor $K^*$ may be used to assign a priority to this constraint being met, over the control criterion being satisfied. Other typical constraints added in this fashion are ones limiting the sizes of moves for each manipulated variable.

(b) Time Variant Constraints

These are constraints which cannot be evaluated numerically in an offline environment. Hence if a valve is 96% open, how much flow capacity remains? The answer may not be available offline so that if a positive move in flow is called for, the limit of the valve in terms of flow rate must be evaluated online. The inclusion of these constraint equations into the basic model equation (9) online is undesirable since the evaluation of equation (6) may involve the inverse of an (80×80) matrix which is too time consuming and too prone to numerical errors to allow the online computer to handle it. Hence the basic system description of equation (9) may be redefined into two parts:

$$\left[ \frac{\underline{E}}{E_{M+1}} \right] = \left[ \frac{\underline{S}}{\underline{h}^T} \right] X_{M+1} \quad (10)$$

$$E^* = \underline{S}^* X_{M+1} \quad (11)$$

$E = \underline{S} \cdot X_{M+1}$ is the collection of control criteria and time invariant constraints.

$$E_{M+1} = \underline{h}^T \cdot X_{M+1} \text{ are the time variant constraints.} \quad (12)$$

The object is to find the solution $$\underline{X}_{M+1} = (\underline{S}^{*T}\underline{S}^*)^{-1}\underline{S}^{*T}\underline{E}^* \quad (13)$$

knowing the solution $$\underline{X}_M = (\underline{S}^T\underline{S})^{-1}\underline{S}^T\underline{E} \quad (14)$$

Starting from $$(\underline{S}^{*T}\underline{S}^*)^{-1}\underline{S}^{*T}E^* = [\underline{S}^T\underline{S} + \underline{h}\,\underline{h}^T]^{-1} \cdot \left[ \frac{\underline{S}}{\underline{h}^T} \right]^T \left[ \frac{\underline{E}}{E_{M+1}} \right]$$

Define $\underline{P}_M^{-1} = \underline{S}^T\underline{S}$ and $$\underline{P}_{M+1}^{-1} = \left[ \frac{\underline{S}}{\underline{h}^T} \right]^T \cdot \left[ \frac{\underline{S}}{\underline{h}^T} \right] = \underline{P}_m^{-1} + \underline{h}\underline{h}^T$$

Matrix inversion lemma states:

$$\underline{P}_{M+1} = \underline{P}_M - \underline{P}_M\underline{h}(1+\underline{h}^T\underline{P}_M\underline{h})^{-1}\underline{h}^T\underline{P}_M \quad (15)$$

Hence:

$$\underline{X}_{M+1} = \underline{X}_M + \underline{P}_M\underline{h}[\underline{h}^T\underline{P}_M\underline{h}+1]^{-1}\cdot[E_{M+1}-\underline{h}^T\underline{X}_M] \quad (16)$$

Note that the solution with the addition of real-time constraints is simply the solution to the control and permanent system constraints plus a term describing the real-time constraints. More inportantly, the only operation of significance with respect to the computer is finding the inverse of the term in brackets whose matrix dimension is square and of size equal to the number of constraint violations met.

This is a significantly smaller problem than solving the whole set of equations (10) online, and hence efficiency of computer usage is maximized.

To facilitate an understanding of the invention, an example will be given which utilizes the unique control method. For ease of explanation, the situation chose for the system being controlled has two controlled variables or outputs, and four manipulated variables or inputs. However, it will be apparent that any number of controlled and manipulated variables may be utilized in the method of the invention. Referring now to FIG. 1, there is shown a fluid catalytic cracker (CCU) such as one present in an oil refinery. Three elements comprise the CCU. Regenerator 5 is used to burn the carbon deposits of the catalyst returning from reactor 6. In reactor 6, feed from furnace 9 is "cracked" in the presence of a catalyst to give a range of petroleum products. Main fractionator 7 and product fractionation columns 40 are used to separate out the various products. In a typical cycle of the CCU, fresh feed enters furnace 9 and is heated to a desired temperature via manipulated variable 1 (temperature recorder/controller). Manipulated variable 4 (flow recorder/controller) determines the throughput at the inlet of furnace 9. A portion of this feed, after exiting furnace 9, enters reactor 6. The balance of the feed is combined with recycle catalyst from regenerator 5 in risers 42 and 43, the amount of recycle catalyst being controlled by manipulated variable 2 (temperature recorder/controller). This combined feed stream and catalyst then enters the reactor 6 where cracking occurs. Gaseous products from main fractionator 7 are compressed at compressor 8 before being transferred to product fractionation columns 40.

Spent catalyst from reactor 6 is recycled through line 44, into which air is injected in amounts controlled by manipulated variable 3 (flow recorder/controller). This air allows burning of the carbon deposits to proceed in the regenerator whereupon the catalyst may be recycled. To prevent a condition called "after-burning" from occurring in regenerator 5, manipulated variable 2 is utilized to maintain the temperature in risers 42 and 43, and thus the temperature in regenerator 5, by allowing more or less catalyst circulation. Thus, controlled variable 1, "distance from after-burning" 11 is used to monitor this state of regenerator 5. Information received at process control computer 30 is used to allow adjustment of the manipulated variables. Manipulated variable 3 is utilized to add sufficient air to the regenerator for maintaining maximum operating efficiency. If insufficient burning of the carbon deposits from the catalyst takes place in regenerator 5, the efficiency of reactor 6 decreases.

In addition to controlling the "distance from after-burning" in regenerator 5, pressure on the main fractionator must be maintained, which indirectly maintains the pressure of reactor 6. This information from controlled variable 2, pressure 12, is sent to process control computer 30 to interact with controlled variable 1, wherein processing of the information takes place so that adjustment may be made to the manipulated variables upon their receipt of instructions from computer 30.

In sum, the catalyst circulation rate is adjusted by manipulated variable 2, air rate to regenerator 5 by manipulated variable 3, fresh feed rate by manipulated variable 4, and temperature of the feed at the outlet of furnace 9 by manipulated variable 1, in order to maintain optimum conditions in the regenerator such that the carbonized catalyst is cleaned of carbon deposits without after-burning and while maintaining proper reactor pressure.

It becomes obvious that moving any single manipulated variable will result in a need to compensate this move with moves on other manipulated variables or the CCU will become unbalanced with respect to the carbon mass balance and the heat balance. Hence, it is apparent that the method of the present invention, by allowing complete interaction of manipulated and controlled variables, allows a process to approach its maximum operating constraints much more closely than conventional control systems. Implementation of a typical control system will now be described.

The plant testing done prior to system implementation is accomplished by introducing a test disturbance such as a step in each of the manipulated variables, one at a time, and recording the output for both controlled variables for a period of time sufficiently long to allow the controlled variable to reach a steady state. For this particular process, a duration of 70 minutes is chosen with recordings of the states of the controlled variables being made every 2 minutes, resulting in 35 equal time intervals. Four vectors result from this collection of data, one vector for each manipulated variable. Each vector contains 70 data points, 35 for the first controlled variable and 35 for the second controlled variable. The first element in each group of 35 corresponds to the response of that particular controlled variable, one increment in time after the change in the manipulated variable was introduced. It is possible, and sometimes desirable, when collecting this test data to extent one or more time intervals beyond the regular 2 minute interval chosen here. For example, if the response of a particular controlled variable to a change in any of the process inputs is such that it continuously moves further away from the starting point without ever stabilizing at a new value, this can be accounted for in the future projection by extending the basic time interval between data points from 2 minutes to 60 minutes. This extension allows the projection to incorporate a much greater time span without increasing the size of the data matrices required.

After the test data is collected, the basic matrix may be specified including the time invariant system constraints. First, the total number of moves for each manipulated variable in each cycle of the control method must be chosen. For this example, there will be 15 total moves. For example, if feedback control was absent, this would mean solving equation (6) for 15 moves for each manipulated variable, making the complete series of moves in 15×2 minutes, or 30 minutes, and calculating another 15 moves. However, to allow for feedback control at 2 minute intervals, only the first move of each manipulated variable is made before equation (6) is re-solved, allowing frequent modification of the error vector. At this point, it will be seen that the number of increments in a controlled variable is 35 while the number of increments in each manipulated variable is 15. In the vector-matrix notation of equation (6), this appears as the equation shown in FIG. 2.

In FIG. 2, the first row of matrix S contains the coefficients which, when multiplied by the vector X, calculate, progressively, the contribution of 15 moves of each of the four manipulated variables (represented by $X_i^1$, $X_i^2$, $X_i^3$, and $X_i^4$, respectively) to the overall change in the first controlled variable (represented by $E_i^1$) on the first increment of time beyond the time that the first moves of each manipulated variable were made.

$Q_{1,1}$; $Q_{1,2}$; $Q_{1,3}$; and $Q_{1,4}$ of FIG. 2 are the matrices which contain the results obtained from previous test data (represented by elements "a" in matrix $Q_{i,j}$), for manipulated variables 1, 2, 3 and 4, respectively, the test data being based on the response of the first controlled variable. Likewise, $Q_{2,1}$; $Q_{2,2}$; $Q_{2,3}$ and $Q_{2,4}$ relate manipulated variables 1, 2, 3 and 4, respectively, to the second controlled variable (represented by $E_i^2$ in FIG. 2). The effect of time invariant system constraints must now be included in the overall system. For purposes of the present example, two types of time invariant system constraints will be utilized. First, the size of individual moves of each manipulated variable may be constrained. This is equivalent to specifying in an equation that $$K_i \cdot X_j^i = 0, \begin{array}{l} i = 1 \ldots 4 \text{ (Number of manipulated variables)} \\ j = 1 \ldots 15 \text{ (Number of moves of each manipulated varible)} \end{array} \quad (A)$$

The effect of this equation will be to keep all the moves as close to zero as possible. The weighting factor "$K_i$" may be used to specify how important it will be to meet this system constraint in the particular case. The second constraint that will be utilized in this example will be to keep the air flow rate moves (the moves of manipulated variable 3) such that any individual move would only be limited by the previously discussed step size constraint, but as a whole the air set point would be constrained to the L-P set point for air when the control was initiated. This implies an equation of the form $$(SP_{LP} - SP_c) \cdot K^1 = K^1 \cdot \left( \sum_{j=i}^{15} X_j^3 \right) \quad (B)$$

$SP_{LP}$=L-P set point for air
$SP_c$=Present set point reached last iteration of control program These equations (A and B) may be added to the equation of FIG. 2 so that the matrix S gains a number of rows equal to the number of time invariant constraints. Using the test data collected and the time invariant constraint equations, equation (6) may be solved for vector X by conventional techniques so that a matrix prediction of moves to be made results.

At this point, the number of moves which will be checked for violations of limits or off-control status must be specified. Although several moves into the future are being calculated, here 15, it is only necessary to check the first few moves into the future for possible violations, since a recalculation will occur before the last moves are reached. For this example, the first five moves of each set of 15 moves of each of the four manipulated variables will be limit checked.

The final off-line data required is the matrix $P_M$ of equation (16). Since only 5 of the 15 moves of each of the four manipulated variables will be checked, only the first 5 of each set of 15 columns of $P_M$ are required. $P_M$, of course, may be calculated using standard techniques where $P_M$ has been defined as $(S^TS)^{-1}$ and S has been specified earlier in this example as the matrix containing the relevant test data.

Figure 4:
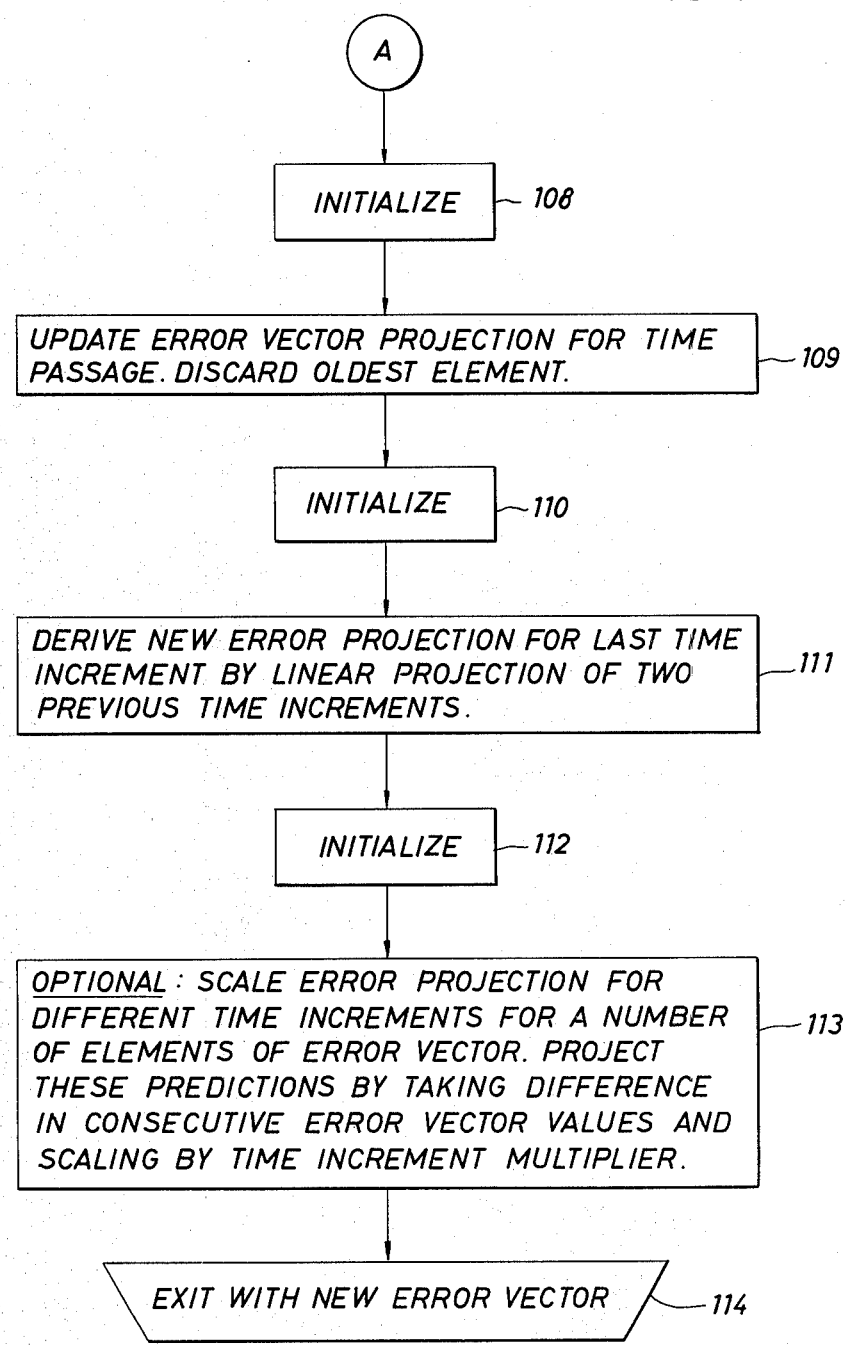
Figure 5:
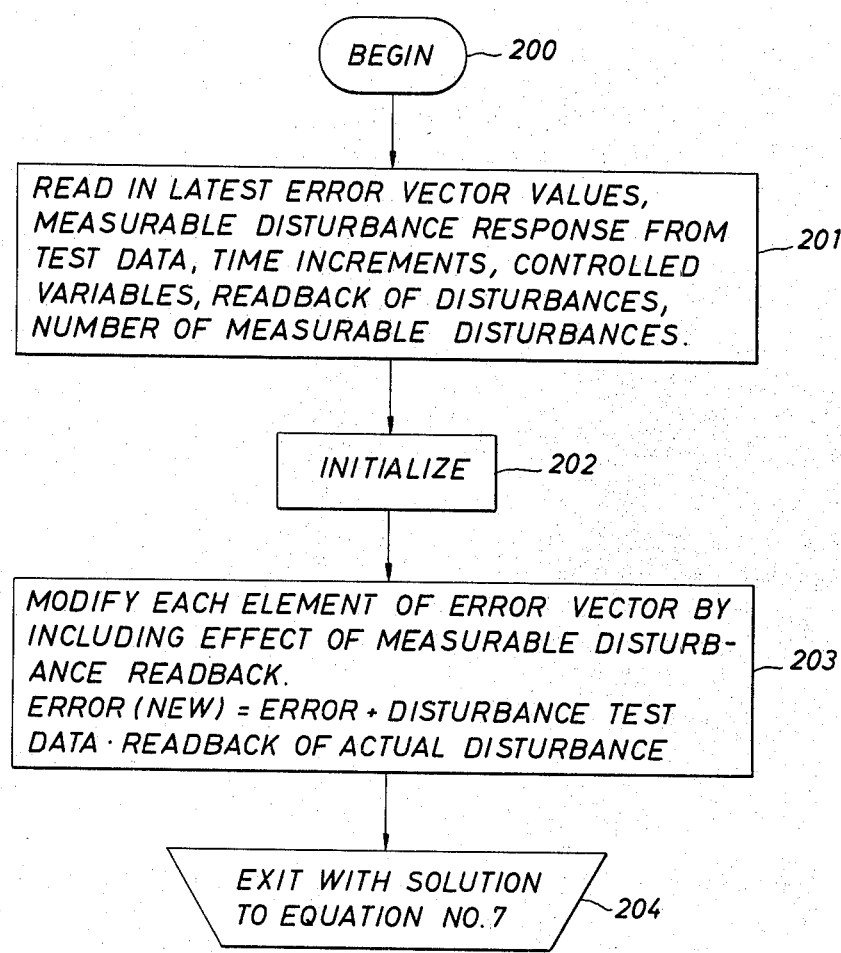
FIG. 5 illustrates a flow chart for including the effects of various measurable disturbances in the control technique.

During operation of a dynamic matrix controlled process, various data are being continually collected from the manipulated variables or inputs and the controlled variables or outputs. In the example given, referring to FIG. 1, temperature recorder/controller 1, temperature recorder/controller 2, flow recorder/controller 3, and flow recorder/controller 4 are used to supply data to the small special purpose computers previously mentioned and, in turn, receive information from the computers for implementation of the necessary moves for process control. Likewise, controlled variables, such as pressure recorder 11 and temperature and oxygen concentration in regenerator combined in a functional manner called the "distance from afterburning" (indicated as controlled variable 1 in FIG. 1), send information to the control computers. Referring now to FIG. 3, and recalling the offline data that has been previously gathered during plant testing as described above, various subroutines may be called in sequence to predict the proper moves that must be made for optimum plant operation. First, equation (7) must be solved to arrive at an updated error vector. At block 101 of FIG. 3 data needed for equation (7) solution is collected. The last-calculated error vector values, test data points (obtained from previous plant testing), controlled variable set points and readback, and specification of control system size and time periods are read into the memory of the computer. Block 102 represents the initialization of counters, which is necessary to facilitate the iterative calculations used to update each element of the error vector. The first series of calculations, illustrated by block 103, modifies the old error vector for the effects of the last move. The test matrix, represented by matrix S of FIG. 2, is multiplied by the vector of the last set of moves made and this quantity is subtracted from the last error vector, element by element, for each manipulated and controlled variable. After initializing the counters in Block 104, the real time error which currently exists between the actual position of the controlled variables and their predicted values is compared in block 105 with the last-calculated error prediction, resulting in a translation value if a difference exists. This translation value is then added to each element of the error vector (block 107) to account for the difference between the actual and predicted error values. After initialization of counters in block 108 of FIG. 4, each element of this partially updated error vector is then updated for passage of time. This is accomplished by moving each element of the error vector for each of the two controlled variables up one row, discarding the element representing present time. Conventional linear extrapolation is used to determine the element representing the end of the projection, as indicated in block 111. Before exiting with an updated error vector, a step which may be preferable in a particular situation involves scaling a number of values of the error vector to be projected for a time in excess of the 2 minute interval chosen for this example. This is accomplished (block 113) by multiplying the difference between the two consecutive error vectors by the time multiplier (for instance, a multiplier of 30 for a time extension of 60 minutes), assuming that further increases in error vector values are linear. The updated error vector of block 114 is then ready for processing through a second subroutine shown in FIG. 5. Since measurable disturbances may or may not be present in a particular plant under control, the effects of these on the controlled process are included in the updated error vector through the separate subroutine of FIG. 5. This subroutine takes the latest updated error vector, (that generated at FIG. 4, block 114), shown in block 201, and after initialization of counters in block 202, modifies each element of the error vector by adding a factor which is a product of the disturbance test data (response to disturbances gathered during testing) and the actual disturbance readback from the plant and the control (block 203). In this example, no measurable disturbances were present, but it can be seen that, for the purpose of this control technique, a "measurable disturbance" is treated in a similar manner as a manipulated variable in the procedure of updating the error projection. The final result of FIG. 5, block 204, is the vector solution to equation (7).

After evaluating and arriving at a new error vector, a set of moves must be calculated which are based on the projected errors. After appropriate checking of these moves, they are then transmitted to their respective manipulated variables (for this example previously indicated in FIG. 2) for implementation and proper plant control.

Figure 6:
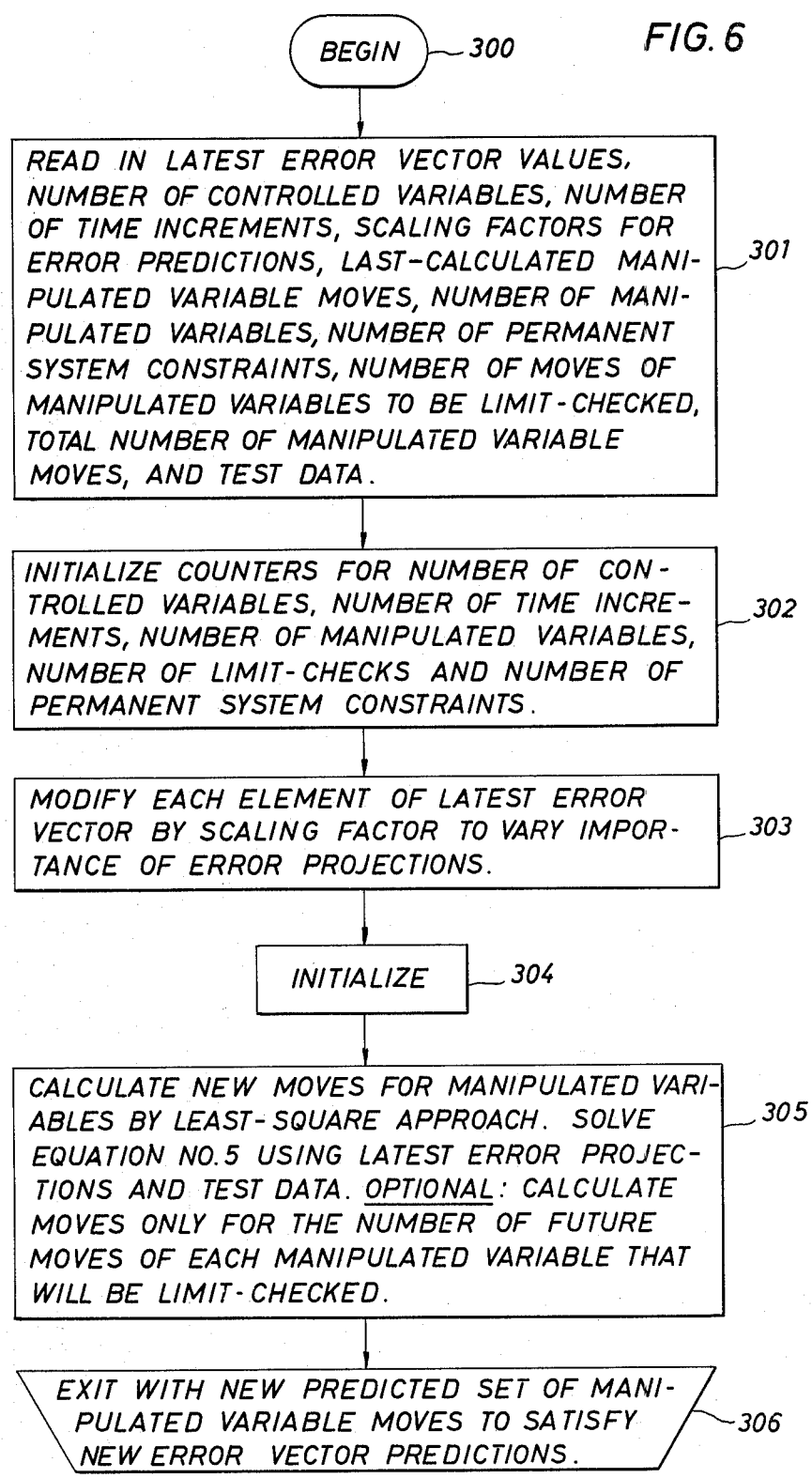
FIG. 6 illustrates a flow chart utilized to calculate a new set of moves for the updated error vector.
Figure 7:
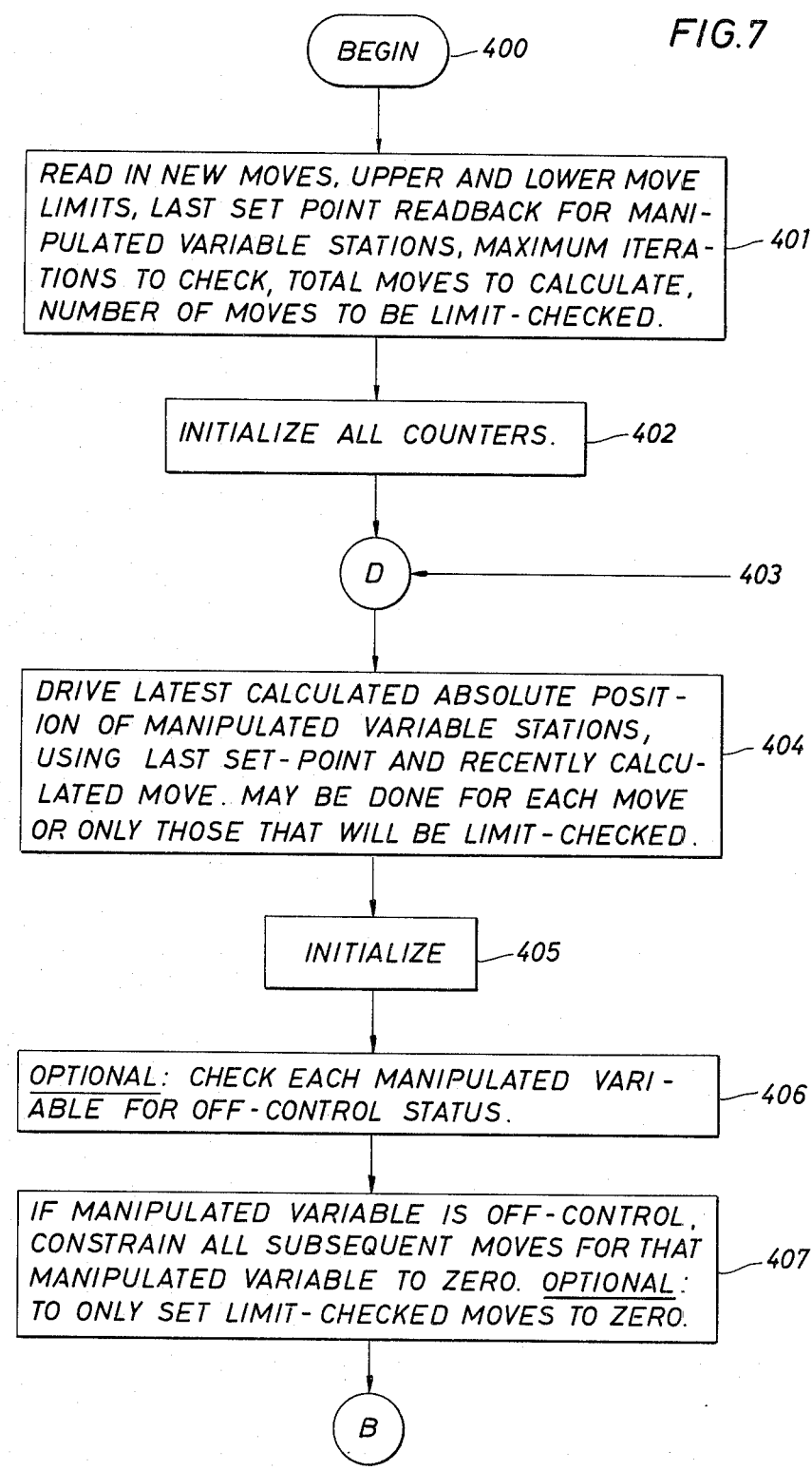
FIGS. 7-9 illustrate a flow chart which is utilized to check all calculated moves for high and low limit violations.

Referring to FIG. 6, a third subroutine calculates a set of moves to be carried out on the manipulated variables of FIG. 2 to satisfy the recently updated error vector and the permanent system constraints which were added during the off-line synthesis of the control technique. At block 301, the projected error values of the controlled variables, test data collected during plant testing, specifications of control system size and time increments (such as number of time increments of error vector projection into the future, number of manipulated variables and controlled variables, number of moves to be calculated, and number of moves to be checked for violation of limits) are read into the memory of the computer. At block 302 all the necessary counters used in the move calculation are initialized. In block 303, each element of the latest set of errors vectors is multiplied by a scaling factor which has the effect of varying the importance to proper plant control of the error projections. This revised set of error values is then used to accomplish the least squares solution of equation (5). "X" in equation (5) represents the new set of moves which is calculated for implementation of the plant control, utilizing the off-line test data and the revised set of error values. At this point, it is important to point out that not all moves calculated are actually implemented. Only the first in the series of moves is actually made and the programs are run again. This provides the necessary feedback control to continually minimize the error values and to approach the L-P operating points. Although only the first of a series of moves is actually made, it is preferable to allow a small number of the total moves to be calculated and checked for violation of operating constraints, as this increases the overall efficiency of the control technique. For instance, of the 15 moves which may be calculated for this example, only 5 of these will actually be calculated and checked for violation of limits. This provides a check sufficiently far into the future to prevent any violations of limits where the limits are being approached. The set of moves that are actually checked against limits, then, by the subroutine of FIG. 7, are the first 5 moves of each manipulated variable of FIG. 2. After solving equation (5), (block 305), a new predicted set of manipulated variable moves results at block 306 which controls the most recent error vector predictions.

Up to this time, the process control implementation has dealt only with time invariant constraints. FIG. 7 illustrates a particularly useful function of the invention, that of correcting the predicted set of moves in the manipulated variables for time variant constraints.

Figure 8:
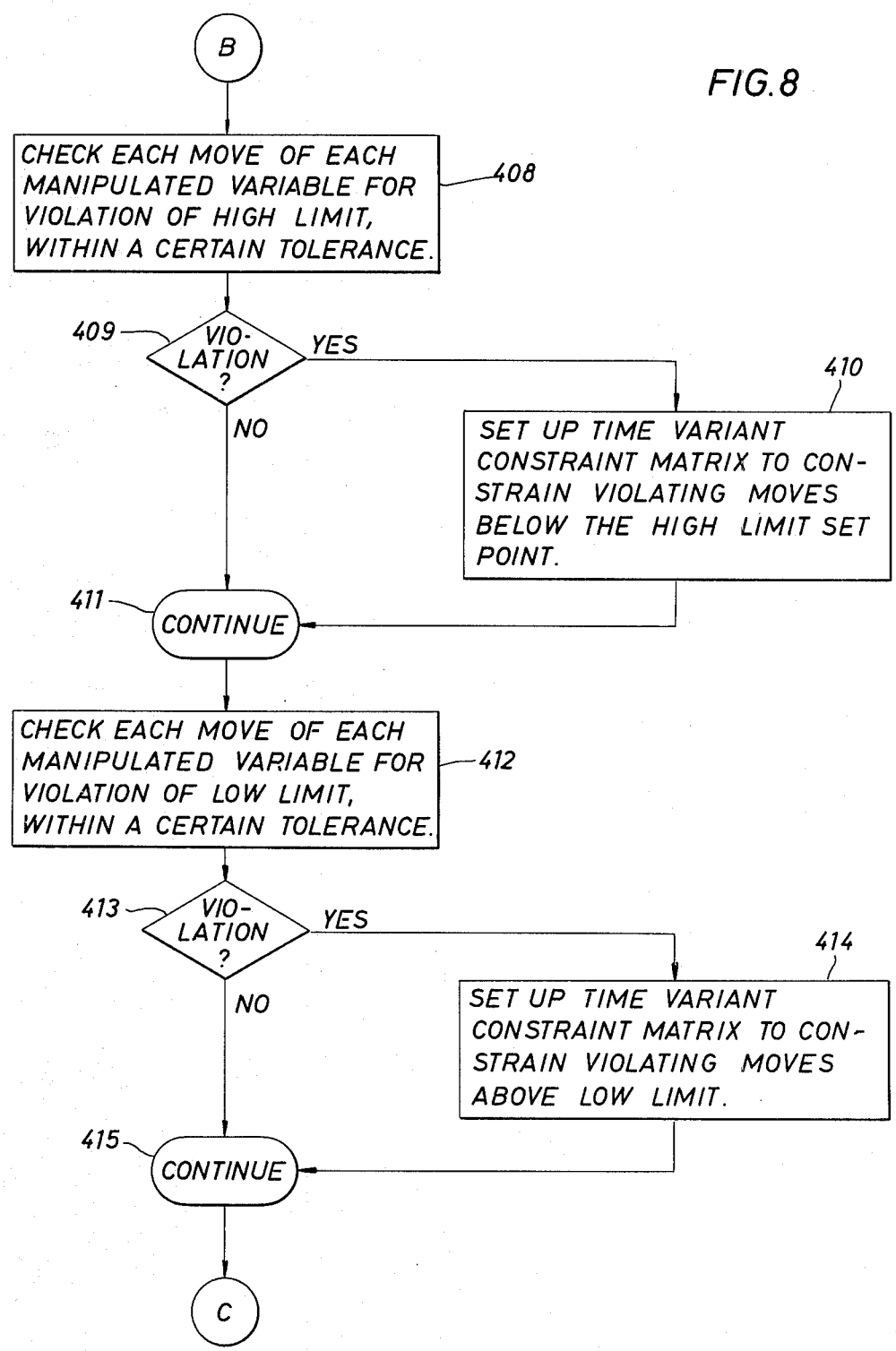
Figure 9:
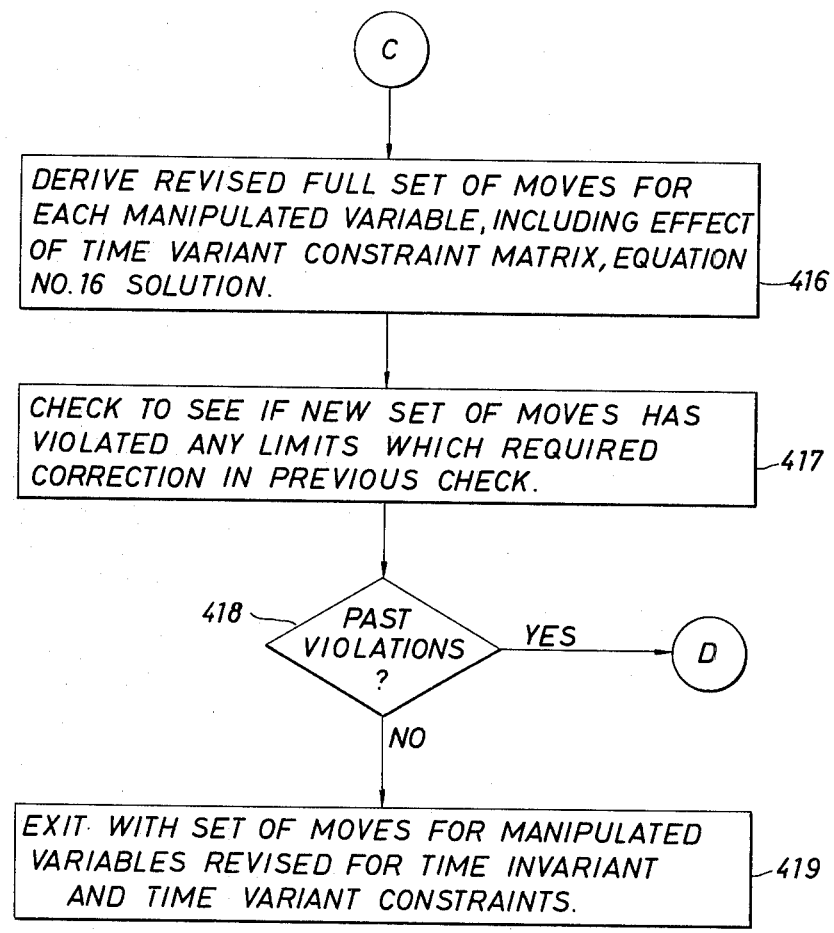

At block 401 of FIG. 7, data necessary to include time variant constraints in the control technique is collected. The most recently calculated set of moves, upper and lower move limits for each of the four manipulated variables of the example shown in FIG. 2, a readback from each manipulated variable of its latest set point, and numbers of moves to be calculated and limit checked are read into the memory. After initializing the appropriate counters to allow for iterative operation, the present position of each manipulated variable must be determined through readback. To the set point which is obtained from readback for each manipulated variable, the most recently calculated move for the manipulated variables are added. This calculation may be performed for each move, but it is preferable to predict the manipulated variable position only so far as the move will be limit-checked, here 5 moves into the future. After initializing at block 405, an optional, though preferable step involves checking each of the four manipulated variables of FIG. 2 for off-control status. If a manipulated variable is off-control, for any reason whatever, future moves of that manipulated variable are set to zero. Of course, it can be seen that this has the effect of allowing all of the remaining on-control manipulated variables to compensate by their moves for any manipulated variable which is off-control. In FIG. 8, high and low limits for each manipulated variable are checked with the most recently calculated moves to determine if any violations now exist or if any violations will occur within a certain time into the future (such as 5 moves). First, each manipulated variable is checked for violation of high limit within a certain tolerance, the tolerance merely providing a safety margin. If violations occur in future predicted moves, those moves are forced to go no further than the defined operating constraint. The remaining moves, which formerly did not violate any constraints, are then recalculated to reflect the effect of constraints on the control of the controlled variables projection. To accomplish this, a time variant constraint matrix is constructed, which step is represented at block 410 of FIG. 8. Referring to FIG. 10, a representation is shown of the time variant constraint equations which are included in the control technique while the system is on-line. For example, if upon checking, it is determined that a high limit violation would occur on the third move in the future of manipulated variable 1 ($X_3^1$ in (3) of FIG. 10), a set of equations must be constructed which may be included with the basic equation (6) for system solution. Accordingly, brackets 1 enclose the portion added to the error vector "E" in the on-line implementation. "HI-TL" in FIG. 10 indicates the high limit within a tolerance, violation of which causes implementation of the time variant constraint option as indicated at block 408, FIG. 8. "STP" of FIG. 10 indicates the last set point resulting from the most recent actual move of manipulated variable 1. "W", indicated in brackets 1 and 2, is merely a multiplicative weight used to assign more or less importance to the particular time variant constraint equations. The first row enclosed in brackets 2, then when multiplied by the vector in brackets 3, constrains the first three moves of manipulated variable 1 (as indicated by $X_1^1$, $X_2^1$ and $X_3^1$, enclosed in brackets 3 of FIG. 10) to equal the quantity "HI-TL-STP", so as not to exceed the absolute high limit for that particular manipulated variable. Multiplying the other two rows of the matrix enclosed in brackets 2 with the vector in brackets 3 merely sets the fourth and fifth moves into the future of manipulated variable 1 ($X_4^1$, $X_5^1$) equal to zero. The end result is that, when the time variant constraint equations are added to the matrix system generated off-line, real time conditions are accounted for during process control. Of course, the simplification outlined above may be extended to any number of controlled variables, manipulated variables or manipulated variable moves. In like manner, each manipulated variable is checked at block 412 for violation of a low limit, and again a tolerance is included to provide a safety margin. If present or future low limit violations occur, those moves are also forced to go no further than the defined operating constraint. The remaining moves which formerly did not violate any constraints are then recalculated to reflect the effect of constraints on the control of the controlled variables projection, setting up time variant constraint matrices similar to those outlined above. After the time variant constraint matrices for high and low limit violations are compiled, a new, revised set of moves is calculated using equation (16), which has the effect of including both time variant and time invariant constraints in the final process control technique solution (block 416). Finally, at block 417 of FIG. 9, a final check on the set of moves derived at block 416 is made to determine whether the new set of moves has violated any limits. If any violations are discovered, a new set of moves may be derived, indicated by entry into the subroutine of block 403 of FIG. 7. A number of these iterations may be made if a valid set of moves is not attained during the first iteration, and it is preferable to set a maximum number of iterations that will be performed before control is returned to the user. The final resulting set of moves of block 419 of FIG. 9 has then been corrected for both time invariant and time variant constraints. After the first move of each manipulated variable is made, the process is repeated, starting with the subroutine of FIG. 3.

From the foregoing, it can be seen that a novel method of proces or plant control has been provided whereby outputs and input moves are predicted for a substantial time into the future and both time variant and time invariant constraints are included in the control technique implementation, thus maximizing profits by allowing the plant to operate as closely as possible to system constraints.

It will be understood that various modifications of this control technique may occur to those skilled in the art and it is intended that this invention be limited only by the scope of the claims.

What is claimed is:

1. A method of controlling and optimizing the operation of a process having a plurality of independently controlled, manipulated variables and at least one controlled variable dependent on said manipulated variables, said method comprising the steps of:
   introducing test disturbances in said manipulated variables and measuring the effect of the disturbances on said controlled variable;
   calculating at discrete intervals of time from said introducing and measuring the magnitude of response of said controlled variable to a given change in one of said manipulated variables;
   measuring the present values of said manipulated variables and said controlled variable;
   using said calculated magnitude of response to calculate for discrete intervals of time a new set of moves for said manipulated variables for obtaining new values and for moving said controlled variable toward its optimum setpoint; and
   adjusting said manipulated variables in accordance with said new set of moves to reach said new values.

2. Method of claim 1 wherein for each discrete interval of time said new values are compared with said present values of said manipulated variables to determine if said manipulated variables can be moved to said new values.

3. Method of claim 2 further comprising removing at least a first manipulated variable from the method and recalculating a new set of moves for the remaining manipulated variables if said first manipulated variable cannot be moved to said new value.

4. Method of claim 1 wherein said measured values are used to form a projection in time of the future value of said controlled variable.

5. Method of claim 1 wherein a number of consecutive moves of said manipulated variables are calculated to reach said future value of said controlled variable.

6. Method of claim 5 wherein only a part of said consecutive moves are implemented before recalculating a new set of moves.

7. Method according to claim 1 wherein said process has a plurality of controlled variables and said controlled variables are assigned weighting factors for moving some of said controlled variables toward their respective setpoints in a manner more efficient than others of said controlled variables.

8. Method according to claim 1, further comprising:
   introducing test disturbances in a set of measurable disturbances not a part of said manipulated variables;
   calculating from said introducing of said measurable disturbances the response of said controlled variable to a given change in one of said measurable disturbances; and
   using said calculated response to said measurable disturbances to calculate said new set of moves to move said controlled variable toward its optimum setpoint.

* * * * *